O. F. TALLMAN & F. E. HUBERT.
LINE TESTING INSTRUMENT.
APPLICATION FILED JULY 20, 1914.

1,257,651.

Patented Feb. 26, 1918.

Witnesses

Inventors;
Oscar F. Tallman,
Fred E. Hubert,
By

UNITED STATES PATENT OFFICE.

OSCAR F. TALLMAN AND FRED E. HUBERT, OF ST. LOUIS, MISSOURI, ASSIGNORS TO W. N. MATTHEWS AND BROTHER, INC., OF ST. LOUIS, MISSOURI, A CORPORATION OF NEW MEXICO.

LINE-TESTING INSTRUMENT.

1,257,651.   Specification of Letters Patent.   Patented Feb. 26, 1918.

Application filed July 20, 1914. Serial No. 851,919.

*To all whom it may concern:*

Be it known that we, OSCAR F. TALLMAN and FRED E. HUBERT, citizens of the United States, residing at the city of St. Louis, State of Missouri, have invented a certain new and useful Improvement in Line-Testing Instruments, of which the following is a full, clear, and exact description, such as will enable others skilled in the art to which it appertains to make and use the same, reference being had to the accompanying drawings, forming part of this specification.

Our invention relates to line testing instruments which are designed for the purpose of locating faults in hidden electrical conductors, and relates specifically to certain new and useful improvements to a form of instrument which is designed to impress upon a hidden conductor under test some characteristic form of pulsating or varying current which may be detected by a suitable inspecting instrument and be plainly distinguishable from the inductive influences of other currents or electrical disturbances in the vicinity of the line under test.

In devices of this nature there are two important objects to be attained; first, the inspecting current must be of a nature such as will traverse the line under test to the fault and be readily detected by the inspecting instrument; second, the current must be of such nature that it will not influence or affect adjacent conductors and thereby subject them to abnormal influences which, in telephone work, for which my apparatus is particularly designed, causes such other lines to become noisy and service thereover impaired.

Because of the fact that a crossed or grounded conductor may be carrying almost any kind of a current which will inductively influence the inspecting instrument, it is obvious that the test current must be capable of a wide variety of variations in order that a characteristic current may be produced which may be readily distinguishable from such other currents. Furthermore, in view of the wide range of distances over which the test current must be sent, it is necessary to provide a means for varying its form, its quantity, and its potential.

Therefore, our invention has for its purpose the provision of an instrument which is simple in its construction and operation, which is compact and easily transportable by a line inspector, and which at the same time is possessed of features giving it the range and utility indicated above.

Figure 1:
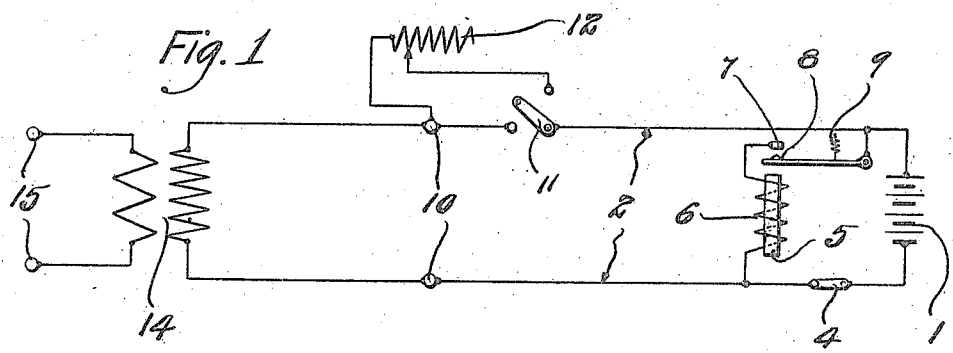
Figure 2:
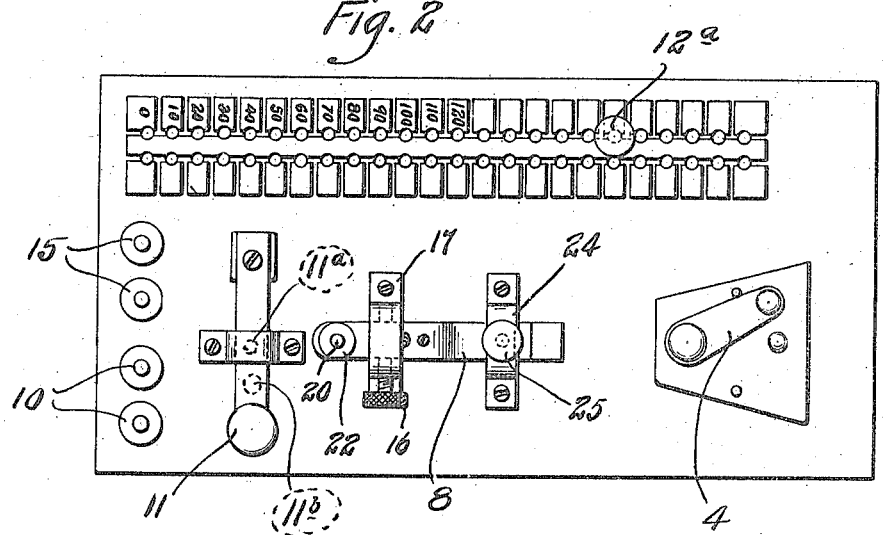
Figure 3:
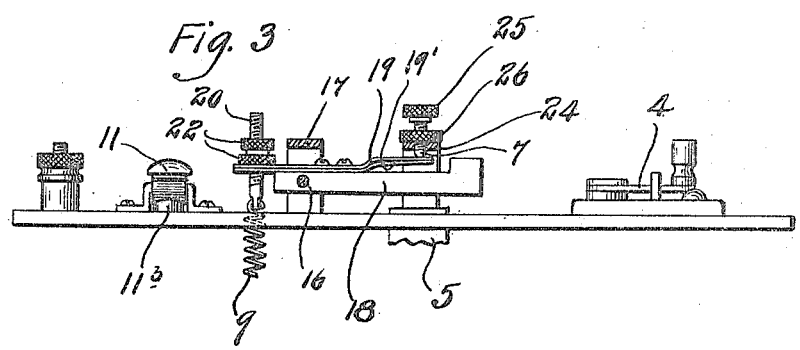

In the accompanying drawings, we have illustrated one embodiment, Figure 1 being a diagram thereof, Fig. 2 a top view of the device, and Fig. 3 a partial side elevation partly in section on line 3—3 of Fig. 2.

In the drawings let 1 indicate a battery, 2 its circuit wires and 4 a switch for opening and closing the battery circuit. 5 is the core of a simple single wound coil 6 terminating in the contact 7 with which the battery 8 has vibratory coöperation through the influence of spring 9 and the electromagnetic action of the coil 6 and core 5. The vibrator 8 has electrical connection across the battery circuit from coil 6, so that when the vibrator 8 is closed with the contact 7, the current of the battery is short-circuited through the coil, the contact and the vibrator. When the electrical coöperation of the contact 7 and the vibrator 8 is broken by the electro-magnetic influence of coil 6 and core 5, the coil and the battery discharge over wires 2, to the binding posts 10 by way of switch 11 which normally closes the battery circuit. The faulty conductor which is under test is connected to one of the binding posts 10, and the sheath of the cable or the conductor with which the faulty conductor is grounded or crossed is connected to the other of said binding posts. Consequently, the discharge of the battery and the coil to the binding posts will impress a current on the faulty conductor which will continue to the point of fault or ground, to which point it may be followed by the inspector with a suitable detecting instrument.

As a means for a preliminary sounding whereby to determine the approximate location of the fault, we employ the variable resistance 12 which may be thrown in series in the circuit by means of the switch 11. Knowing the per linear measurement resistance of the conductors connected to the binding posts 10, the approximate distance to the point of fault may be determined by the amount of the variable resistance 12 which must be introduced into the circuit in order to give the same intensity of tone in the inspecting instrument when the latter is applied at a binding post when such resistance is in, and the faulty conductor out of circuit, as when the resistance is out and the faulty conductor in. This test is made by alternately throwing the resistance in and out by operating the switch 11, and the faulty conductor in and out by short-circuiting the leads from the binding posts 10 thereto.

By virtue of various features of the device hereinafter to be explained, the device may be properly operated by a single cell constituting battery 1, of very low potential. On short loops, however, a better effect and a clearer sound may be produced in the detecting instrument by using even a lower potential than that supplied by a single cell. Consequently, I insert a step-down coil 14, the secondary of which is attached to the binding posts 15, which coil reduces the potential effective at the posts 15 to a very low voltage. When such low voltage, therefore, is to be employed, the connections for the conductor under test are made with the binding posts 15. The coil 14 has the additional effect of providing a capacity across the make-and-break of the contact 7 and vibrator 8 which does away with destructive sparking at the contact.

In Figs. 2 and 3, illustrating the commercial embodiment of the device, it will be seen that the resistance 12 is varied by means of the plug 12$^a$, and the amount of said resistance in use will be indicated by the position of said plug. The switch 11 is a spring switch which normally cuts out the resistance 12 and cuts in the battery circuit on the contact 11$^a$. Depression of the switch 11 cuts in the resistance 12 through the contact 11$^b$.

For the purpose of rendering the current properly variable, I employ the form of vibrator shown in Figs. 2 and 3 which is pivoted at 16 in the yoke 17, and which consists of the heavy armature member 18 and the contact springs 19 and 19'. The arm of the armature 18 which coöperates with the core 5, and carries the contact springs, is long and heavy, thereby giving the vibrator considerable inertia. The arm of the vibrator on the other side of the pivot 16 is short, and the ends of the contact springs extend beyond the end of the armature, and provide a slightly resilient mounting for the adjustable screw 20 which forms part of the connection of the spring 21 with the vibrator, and which is adjustable to vary the effective influence of the spring by means of the adjusting nuts 22. The contact 7 which is carried on the yoke 24 is also adjustable relative to the vibrator by means of the thumb screw 25 and the jamb nut 26. This adjusting means, together with the inertia of the armature 18 and the great comparative length of its electro-magnetically operated arm permit of a wide range and great variety of adjustments whereby the characteristic beat of the test current may be regulated. The vibrations may be reduced as low as ten per second, or increased to a greater frequency. This permits of the selection of any frequency which will be most effective on the line under test. The maintenance of a low frequency in a test current is very important for several reasons. In the first place, it is not as annoying on such lines as may be affected because of their proximity to the line under test. In the second place, the regular beat of the low frequency current is more easily discernible in the detecting instrument than is the hum produced by a current of higher frequency. Furthermore, the low frequency permits the use of a very low voltage which in itself is desirable for several reasons. In the first place, the low voltage does not affect adjacent lines, nor does it have a self-inducing effect in the conductor under test as does a high voltage. Furthermore, it makes it possible to locate wet spots in a cable very easily, a performance practically impossible with a high voltage. This is due to the fact that the current under high voltage dries out the wet spot in the cable before the inspector reaches it, and therefore he will pass it without his attention being called to it by the stopping of the current. With the use of high voltages, it frequently occurs that insulation of the lines is broken down at some weak point and hence the testing of a line in trouble with a high voltage will frequently result in causing new shorts or grounds. With the use of the low voltage, which is possible with our instrument, all of these difficulties are obviated.

Another very important consideration resides in the fact that with the use of low voltage, which, as above stated, may be taken from a single dry battery cell, the weight of the instrument is reduced practically fifty (50%) per cent. This is a very important consideration in the salability and commercial use of the device, as it must be remembered that these devices are carried about by linemen, and operated from poles, all of which renders our instrument of vastly greater utility than a heavy one.

This lightness is gained not only in reducing the amount of battery carried, but furthermore in greatly reducing the size of the coil.

We are aware that various modifications may be made in our device and therefore it is not our intention that our invention be limited to the form shown, but that it may be construed to include all forms and modifications properly within its spirit and scope.

We claim:

1. An inspecting instrument comprising a battery, a slowly operating vibrator for short-circuiting the same, a low resistance single wound coil for operating the vibrator, a variable resistance adapted to be cut into and out of the battery circuit within the instrument, means whereby an external conductor may be connected in the battery circuit, and a transformer, the primary of which is connected in the battery circuit and the secondary of which is arranged for connection to an external conductor.

2. In a testing instrument for line inspection, a battery, a battery circuit adapted to be energized therefrom and including means whereby an external conductor may be connected therein, a vibrator adapted to short-circuit the battery, a shunt coil for operating the same, means for selectively varying the rate of operation of the vibrator, and a step-down transformer, the primary of which is in the battery circuit and the secondary of which is adapted for connection to an external conductor.

3. In a testing instrument, a battery, a battery circuit adapted to be energized thereby and including means whereby an external conductor may be connected therein, a slowly operating vibrator adapted to short circuit the battery, a low potential coil adapted to operate the vibrator, and a variable resistance adapted to be cut into and out of the battery circuit within the instrument for the purpose described.

4. In an instrument for line inspection, a source of electrical current supply, a circuit adapted to be energized therefrom and arranged for connection of an external conductor therein, a low potential coil disposed to be energized from said source, a slowly operating vibrator actuated by the influence of said coil to short-circuit the source of supply, and means for selectively varying the rate of operation of the vibrator to audibly differentiable speeds.

5. In an instrument for auditory line inspection, a source of electrical current, a circuit adapted to be energized therefrom and arranged for the connection of an external conductor therein, a low potential coil disposed to be energized from said source, and a slowly operating vibrator actuated by the influence of said coil to short-circuit the source of current, said vibrator being continuously operable at frequencies which vary the effective electro-motive-force of the device between its maximum and minimum at rates of less than thirty per second.

In testimony whereof we hereunto affix our signatures in the presence of two witnesses, this 10th day of July, 1914.

OSCAR F. TALLMAN.
FRED E. HUBERT.

Witnesses:
C. S. BUTLER,
M. A. HANDEL.